United States Patent
Shang et al.

(10) Patent No.: US 10,503,292 B2
(45) Date of Patent: Dec. 10, 2019

(54) DISPLAY DEVICE INTEGRATED WITH TOUCH FUNCTION AND A DRIVING METHOD THEREOF

(71) Applicant: BOE TECHNOLOGY GROUP CO., LTD., Beijing (CN)

(72) Inventors: Guangliang Shang, Beijing (CN); Jiayang Zhao, Beijing (CN); Haoliang Zheng, Beijing (CN); Mingfu Han, Beijing (CN); Feng Liao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 38 days.

(21) Appl. No.: 15/039,627

(22) PCT Filed: Sep. 21, 2015

(86) PCT No.: PCT/CN2015/090097
§ 371 (c)(1),
(2) Date: May 26, 2016

(87) PCT Pub. No.: WO2016/192245
PCT Pub. Date: Dec. 8, 2016

(65) Prior Publication Data
US 2017/0038873 A1    Feb. 9, 2017

(30) Foreign Application Priority Data
May 29, 2015   (CN) .......................... 2015 1 0290237

(51) Int. Cl.
*G06F 3/041*   (2006.01)
*G09G 3/20*    (2006.01)
*G06F 3/044*   (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/0412; G06F 3/0416; G06F 3/044; G06F 2203/04103; G06F 2203/04107; G09G 3/2092; G09G 2310/08
(Continued)

(56) References Cited

U.S. PATENT DOCUMENTS

2010/0052700 A1* 3/2010 Yano ........................ G06F 3/044
324/658
2010/0079402 A1  4/2010 Grunthaner et al.
(Continued)

FOREIGN PATENT DOCUMENTS

CN     101178524 A     5/2008
CN     101673163 A     3/2010
(Continued)

OTHER PUBLICATIONS

Search Report and Written Opinion dated Feb. 15, 2016 from State Intellectual Property Office of the P.R. China.
(Continued)

*Primary Examiner* — Mark W Regn
(74) *Attorney, Agent, or Firm* — Dilworth & Barrese, LLP.; Michael J. Musella, Esq.

(57) ABSTRACT

A display device integrated with touch function and a driving method thereof, the display device comprising: a display unit (101); a touch detection circuit (102) configured to conduct touch detection, and generate a plurality of touch detection signals; and a driving unit (105) configured to simultaneously driving a data refresh of the display unit (101) and the touch detection of the touch detection circuit (102), wherein region for data refresh and region for touch detection do not overlap at the same time period. The present disclosure prolongs the charging time for the display pixels and solves the problem of insufficient charging time of the integrated touch high resolution display device by a simul-
(Continued)

taneous touch and the display driving. In the meantime, by incorporating a reference unit, a reference voltage which is not affected by touching and can reflect in real time the signal interferences caused by display driving (namely, data refresh) is obtained.

12 Claims, 9 Drawing Sheets

(52) U.S. Cl.
CPC ......... *G06F 3/0418* (2013.01); *G09G 3/2092* (2013.01); *G06F 2203/04107* (2013.01); *G09G 2310/08* (2013.01)

(58) Field of Classification Search
USPC ........................................................ 345/173
See application file for complete search history.

(56) References Cited

U.S. PATENT DOCUMENTS

| | | | |
|---|---|---|---|
| 2010/0238134 A1 | 9/2010 | Day et al. | |
| 2011/0176037 A1 | 7/2011 | Benkley, III | |
| 2013/0257786 A1 | 10/2013 | Brown et al. | |
| 2013/0271426 A1* | 10/2013 | Yumoto | G06F 3/041 345/174 |
| 2013/0285952 A1 | 10/2013 | Huang et al. | |
| 2014/0015796 A1 | 1/2014 | Phillip | |
| 2016/0147356 A1* | 5/2016 | Bai | G06F 3/0412 345/173 |
| 2016/0291765 A1* | 10/2016 | Shen | G06F 3/0416 |

FOREIGN PATENT DOCUMENTS

| | | |
|---|---|---|
| CN | 102239461 A | 11/2011 |
| CN | 102693703 A | 9/2012 |
| CN | 103314342 A | 9/2013 |
| CN | 103314345 A | 9/2013 |
| CN | 103353816 A | 10/2013 |
| CN | 103455201 A | 12/2013 |
| CN | 104281352 A | 1/2015 |
| CN | 104375731 A | 2/2015 |
| CN | 104407760 A | 3/2015 |
| CN | 104699307 A | 6/2015 |
| CN | 104834406 A | 8/2015 |
| EP | 2336864 A1 | 6/2011 |
| EP | 2477101 A2 | 1/2012 |

OTHER PUBLICATIONS

First Chinese office action dated Apr. 28, 2017.
Chinese Office Action dated Nov. 7, 2017.
Partial Supplementary European Search Report issued by the European Patent Office dated Nov. 12, 2018.
European Extended Search Report issued by the European Patent Office for the corresponding European Patent Application No. 15862137.5. The EESR has an issue date of Mar. 13, 2019.

* cited by examiner

DISPLAY DEVICE INTEGRATED WITH TOUCH FUNCTION AND A DRIVING METHOD THEREOF

TECHNICAL FIELD

The present disclosure relates to a touch screen, in particular to a display device integrated with touch function and a driving method for said display device.

BACKGROUND

Current touch technology generally adopts time-division driving, wherein timing controller time-divides a frame period into a display time T1 and a touch time T2. In the display time, the storage capacitor of the display device is charged; in the touch time, the touch signal will be detected, which will reduce the charging time for the storage capacitor and thus affect the display effect.

SUMMARY

Additional aspects and advantages of the present invention will be set forth in part in the description which follows and, in part, will be obvious from the description, or may be learned by practice of the invention.

The present disclosure provides a display device integrated with touch function, comprising: a display unit; a touch detection circuit configured to conduct touch detection and generate a plurality of touch detection signals; and a driving unit configured to simultaneously drive a data refresh of the display unit and the touch detection of the touch detection circuit, wherein a region for the data refresh and a region for the touch detection do not overlap.

The present disclosure further provides a driving method for the display device integrated with touch function and the display device comprising a display unit and a touch detection circuit, said method comprises: simultaneously driving a data refresh of the display unit and the touch detection of the touch detection circuit, wherein a region for the data refresh and a region for the touch detection do not overlap at a same time period.

The present disclosure prolongs the charging time for the display pixels and solves the problem of insufficient charging time of the integrated touch high resolution display device by a simultaneous touch and display driving. In the meantime, by incorporating a reference unit, a reference voltage which is not affected by touching and can reflect in real time the signal interferences caused by display driving (namely, data refresh) is obtained, such that the background noise during the touch detection can be removed and the signal to noise ratio is improved to ensure the accuracy of the touch recognition.

BRIEF DESCRIPTION OF THE DRAWINGS

The preferred embodiment of present invention will be described in details with reference to the drawings, such that the above and other objectives, features, and advantages of the present invention will become more clear, wherein like reference numerals refer to the like structural elements and wherein.

DETAILED DESCRIPTION OF THE EMBODIMENTS

Figure 1:
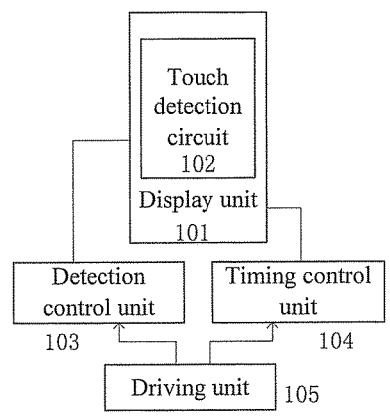
FIG. 1 is a schematic view of a display device integrated with touch function of the present embodiment.

Reference will now be made to the drawings which show the present embodiments to fully describe the present invention. However, the present invention can be in many different forms and should not be construed as limited to the embodiments described herein. Rather, these embodiments are provided so that this disclosure will be thorough and complete, and will fully express those skilled in the utility model range. In the drawings, the assembly is enlarged for clarity.

It should be understood that when an "element", "connected" or "coupled" to another element, it can be directly connected or coupled to the other element or intervening elements may be present. In contrast, when an element "directly connected to" or "directly coupled to" another element, there are no intervening elements. The same reference numerals indicate like elements. As used herein, the term "and/or" includes any and all combinations of one or more related items listed.

It should be understood that, although the terms first, second, third, etc. describe various elements, components, and/or sections, these elements, components and/or sections are not limited by these terms. These terms are only used for the element, component, or part separate from each other. Thus, a first element discussed below, under the component or part without departing from the premise of teaching the utility model can be termed a second element, component or section.

The terminology used herein solely for the purpose of describing particular embodiments only, and is not intended to limit the utility model. As used herein, the singular forms "a", "an" and "That (this)" is intended to include the plural forms unless the context clearly dictates are not included. It should be understood that the term "includes" indicates that when used in this specification stated features, integers, steps, operations, elements, and/or components, but do not exclude one or more other features, integers, steps, operations, elements, components and/or combinations of the presence or addition.

Unless otherwise defined, all terms (including technical and scientific terms) have the same meanings of ordinary skill in the art of the utility model of common understanding. It should also be understood that, as those terms in the ordinary dictionary definition should be interpreted as having consistent with their meaning in the context of the meaning of art, without applying extreme idealization or formal sense to explain, unless explicitly here to this definition.

The present disclosure prolongs the charging time for the display pixels and solves the problem of insufficient charging time of the integrated touch high resolution display device by a simultaneous touch and display driving. In the meantime, by incorporating a reference unit, a reference voltage which is not affected by touching and can reflect in real time the signal interferences caused by display driving (namely, data refresh) is obtained, such that the background noise during the touch detection can be removed and the signal to noise ratio is improved to ensure the accuracy of the touch recognition.

To describe the technical solution of the present disclosure in details, the following embodiments are given.

Figure 2:
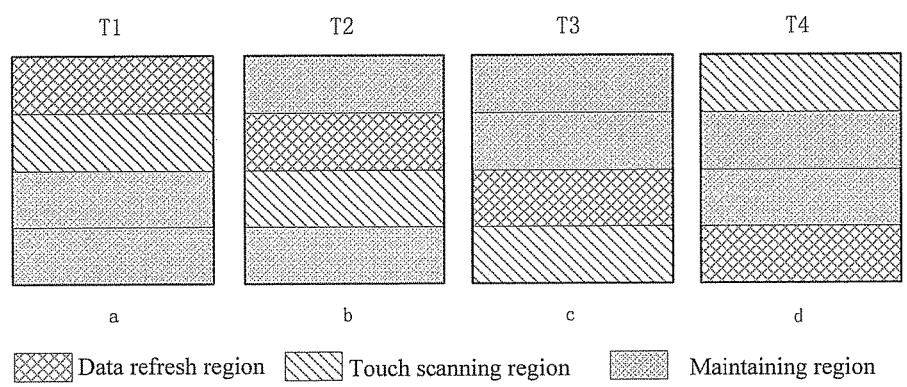
FIG. 2 is a schematic view of a first method for data refresh and touch scanning of the present embodiment.
Figure 3:
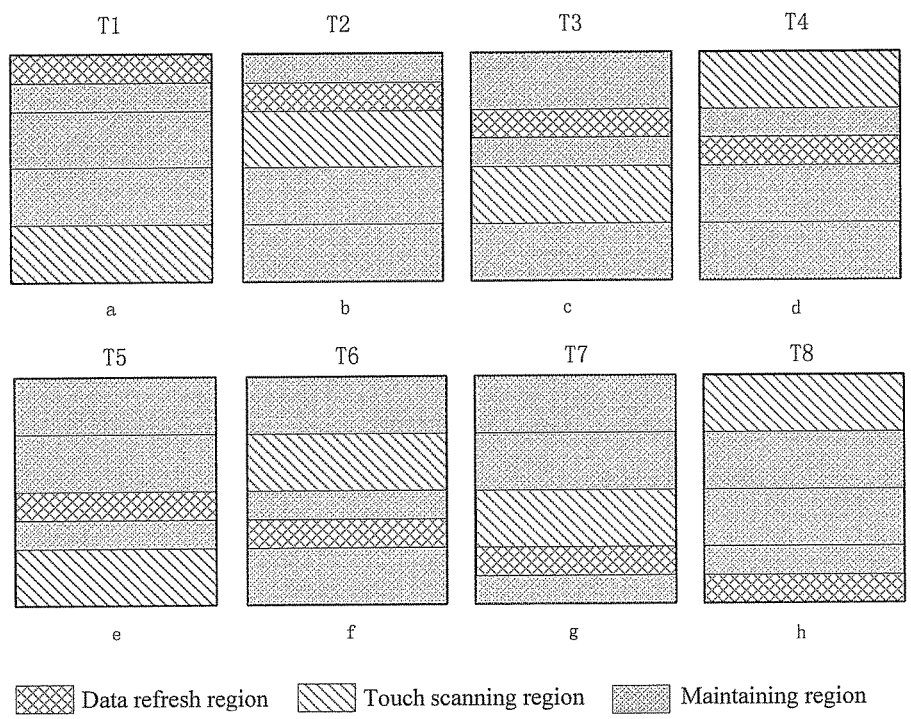
FIG. 3 is a schematic view of a second method for data refresh and touch scanning of the present embodiment.
Figure 4:
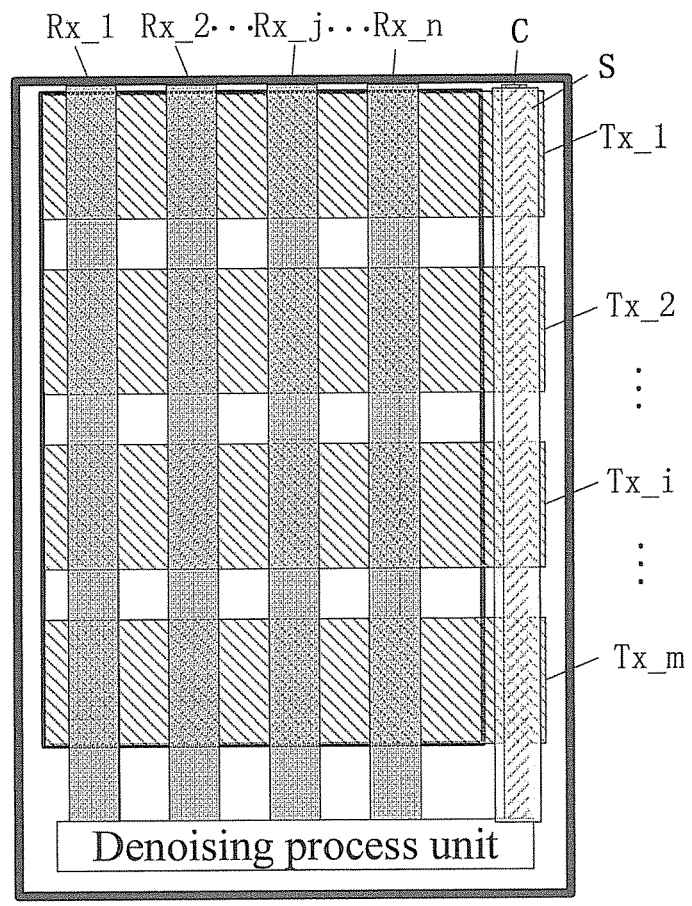
FIG. 4 is a schematic view of a first touch detection circuit configuration of the present embodiment.
Figure 9:
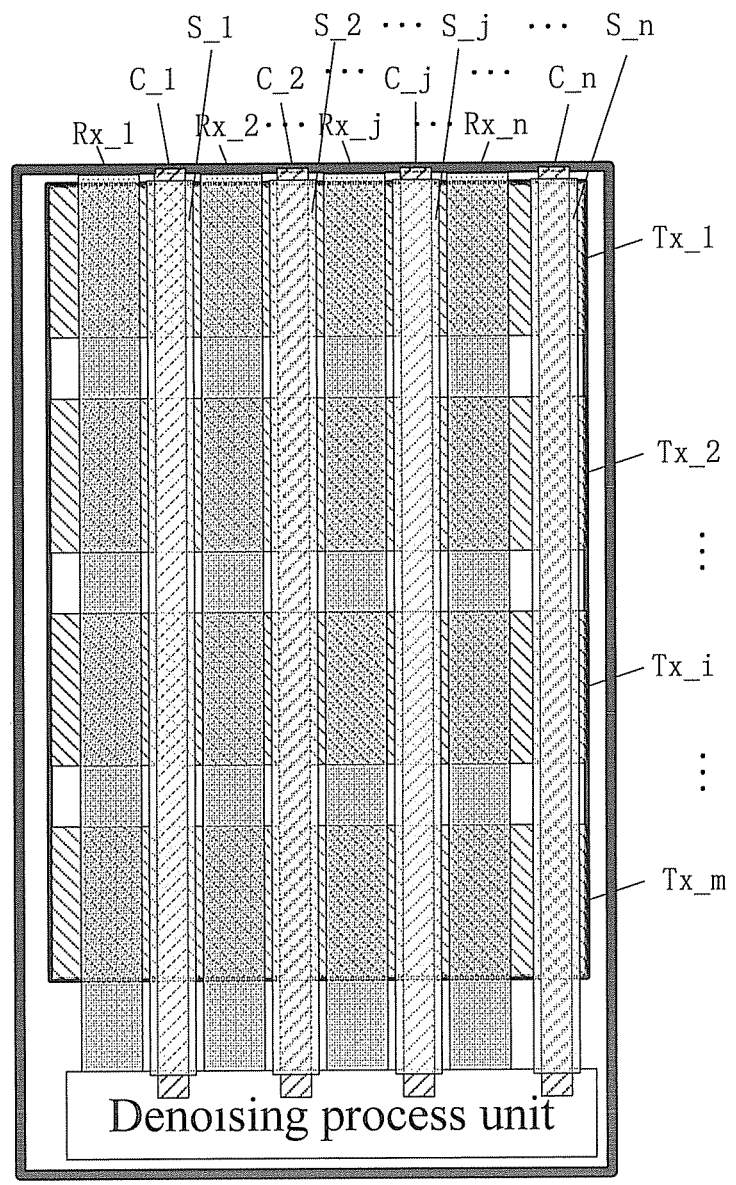
FIG. 9 is a schematic view of a second touch detection circuit configuration of the present embodiment.

1. A display device wherein the data refresh of the touch and display unit are conducted simultaneously, such as shown in FIG. 1;

2. A driving method for simultaneously conducting data refresh of the touch and display unit, such as shown in FIG. 2 and FIG. 3;

3. A touch reference voltage configuration, such as shown in FIG. 4 and FIG. 9;

4. A touch signal detection circuit and its method, such as shown in FIGS. 5-8 and 10-11.

FIG. 1 is a schematic view of a display device integrated with touch function of the present embodiment.

As shown in FIG. 1, a display device integrated with touch function comprises a display unit 101 and a touch detection circuit 102. A detection control unit 103 and a timing control unit 104 are configured to control the touch detection of the touch detection circuit 102 and the data refresh of the display unit 101, respectively. To simultaneously conduct the touch detection and the data refresh, a driving unit 105 is used to drive the detection control unit 103 and the timing control unit 104, such that the touch detection of the touch detection circuit 102 and the data refresh of the display unit 101 are conducted simultaneously.

FIG. 2 is a schematic view of a first method for data refresh and touch scanning of the present embodiment.

In FIG. 2, the touch and data refresh adopt the same frequency in the same time period to refresh different regions, which may e.g., be 60 Hz. It is understood to those skilled in the art that other frequency may also be adopted.

Description will now be made taking as an example a case where each frame of scanning time is divided into 4 time periods.

In T1, when the display unit conducts data refresh for the data refresh region as shown in FIG. 2a, the touch detection circuit scans(detects) the touch scanning region as shown in FIG. 2a.

In T2, when the display unit conducts data refresh for the data refresh region as shown in FIG. 2b, the touch detection circuit scans the touch scanning region as shown in FIG. 2b.

In T3, when the display unit conducts data refresh for the data refresh region as shown in FIG. 2c, the touch detection circuit scans the touch scanning region as shown in FIG. 2c, and In T4, when the display unit conducts data refresh for the data refresh region as shown in FIG. 2d, the touch detection circuit scans the touch scanning region as shown in FIG. 2d.

The above process is then repeated.

FIG. 3 is a schematic view of a second method for data refresh and touch scanning of the present embodiment.

In FIG. 3, the adopted touch detection frequency is double of that of the data refresh, which may for example, be 120 HZ and 60 Hz, respectively. It is understood to those skilled in the art that other frequency may also be adopted. As shown in FIG. 3, different scanning sequence may be made in order to prevent the data refresh region and the touch detection region from being overlapped.

Description will now be made taking as an example a case where each frame of scanning time is divided into 8 time periods.

In T1, when the display unit conducts data refresh for the data refresh region as shown in FIG. 3a, the region scanned by the touch detection circuit is the touch scanning region as shown in FIG. 3a.

In T2, when the display unit conducts data refresh for the data refresh region as shown in FIG. 3b, the region scanned by the touch detection circuit is the touch scanning region as shown in FIG. 3b.

In T3, when the display unit conducts data refresh for the data refresh region as shown in FIG. 3c, the region scanned by the touch detection circuit is the touch scanning region as shown in FIG. 3c.

In T4, when the display unit conducts data refresh for the data refresh region as shown in FIG. 3d, the region scanned by the touch detection circuit is the touch scanning region as shown in FIG. 3d.

In T5, when the display unit conducts data refresh for the data refresh region as shown in FIG. 3e, the region scanned by the touch detection circuit is the touch scanning region as shown in FIG. 3e.

In T6, when the display unit conducts data refresh for the data refresh region as shown in FIG. 3f, the region scanned by the touch detection circuit is the touch scanning region as shown in FIG. 3f.

In T7, when the display unit conducts data refresh for the data refresh region as shown in FIG. 3g, the region scanned by the touch detection circuit is the touch scanning region as shown in FIG. 3g.

In T8, when the display unit conducts data refresh for the data refresh region as shown in FIG. 3h, the region scanned by the touch detection circuit is the touch scanning region as shown in FIG. 3h.

The above process is then repeated.

FIG. 4 is a schematic view of a first touch detection circuit configuration of the present embodiment.

Since the touch detection and the data refresh are conducted simultaneously, the touch detection will be interfered by signals such as gate signals and data signals during data refreshing, the noise of which is loud and varies in real-time. To remove the noise, the present application proposes a solution of incorporating a reference electrode.

As shown in FIG. 4, the first touch detection circuit comprises a touch detection unit, a reference unit and a denoising process unit.

The touch detection unit comprises a plurality of touch driving electrodes Tx and a plurality of touch sensing electrodes Rx configured to conduct touch detection and generate a plurality of touch detection signals. The plurality of touch driving electrodes Tx extends in a first direction (such as, X-axis), and are arranged along a second direction (such as, Y-axis) intersecting the first direction. The plurality of touch sensing electrodes Rx extend in the second direction and are arranged along the first direction. For example, it may include 1st through mth touch driving electrodes Tx and it may include 1st through nth touch sensing electrodes Rx. The plurality of touch driving electrodes Tx intersecting the plurality of touch sensing electrodes Rx. Although FIG.

4 shows that the plurality of touch driving electrodes Tx are below the plurality of touch sensing electrodes Rx, it is understood to those skilled in the art that the plurality of touch driving electrodes Tx may also be disposed above the plurality of touch sensing electrodes Rx.

The reference unit comprises a reference electrode C which overlaps all of the touch driving electrodes Tx in the touch detection unit and is parallel to the touch sensing electrodes Rx and is configured to provide a reference voltage signal.

As shown in FIG. 4, the reference electrode C is located outside the display region, and overlapped with all of the touch driving electrodes Tx in the touch detection unit and shields the interference to the reference voltage signal from the outside touch by a shield layer S. Said shield layer is disposed above the reference electrode C such that the reference electrode becomes a reliable noise reference source and may not be influenced by touching. The reference voltage signal may feedback the data interference in a real time manner. For example, the metal layer may be a separate layer on the colored film.

The denoising process unit is configured to receive the touch detection signal from the touch sensing electrodes Rx and the reference voltage signal from the reference electrode, and process the touch detection signal and the reference voltage signal to generate a touch result signal having the interference of data driving removed.

Figure 5:
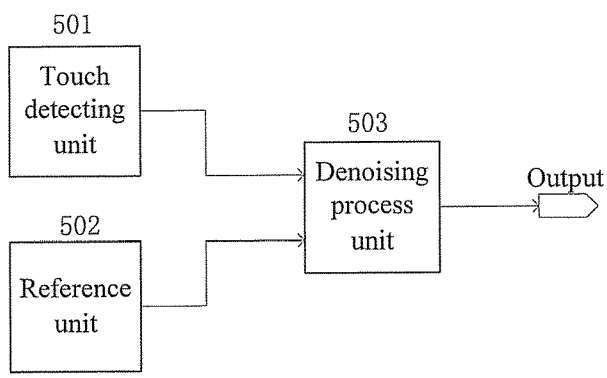
FIG. 5 is a basic frame view of a first touch detection circuit noise processing of the present embodiment.

FIG. 5 is a basic frame view of a first touch detection circuit noise processing of the present embodiment.

The procedure for touch detection and processing is shown in FIG. 5, which includes three parts of a touch detection unit 501, a reference unit 502 and a denoising process unit 503. Firstly, the touch detection unit 501 detects by touching a change in the touch detection signal, meanwhile the reference unit 502 obtains a reference voltage signal, the touch detection signal and the reference voltage signal go through the denoising process unit 503 to remove the background noise generated by data refresh and finally, the denoised touch result signal is output to the touch recognition system for subsequent touch recognition process.

Figure 6:
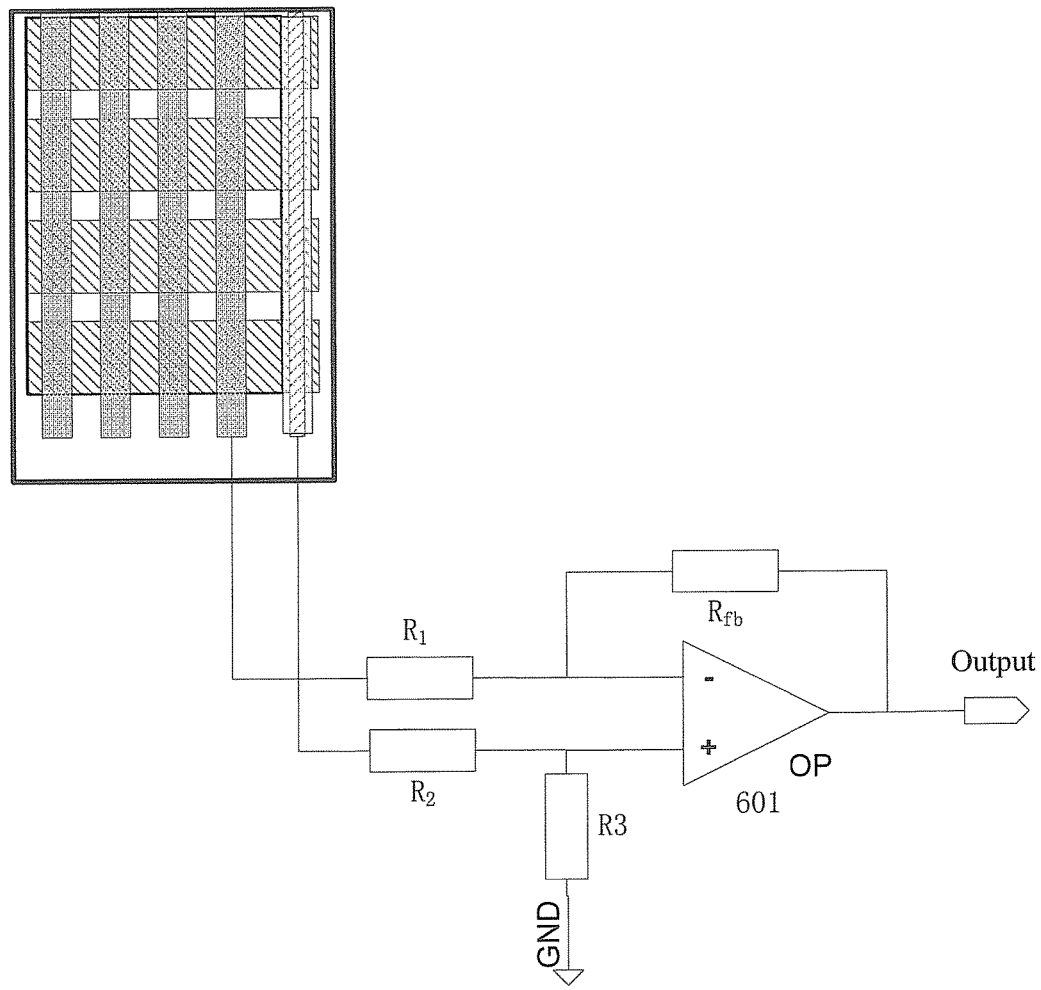
FIG. 6 is a circuit view of a first touch detection circuit noise processing device of the present embodiment.

FIG. 6 is a circuit view of a first touch detection circuit noise processing of the present embodiment. As shown in FIG. 6, the touch detection circuit is configured to implement the touch detection unit of FIG. 5; the reference receiving circuit is configured to implement the reference unit of FIG. 5; and the subtract unit 601 is configured to implement the denoising process unit of FIG. 5. By the denoising process unit, a touch result signal having the interference of data driving removed is obtained.

Although FIG. 6 only shows a circuit for connecting and processing an individual touch sensing electrode Rx, it is understood to those skilled in the art that other touch sensing electrodes Rx may be subjected to similar connecting and processing. That is to say, for a plurality of touch sensing electrodes Rx_1~Rx_n, the denoising process unit comprises n subtract circuits. For conciseness, we will not repeat herein.

Figure 7:
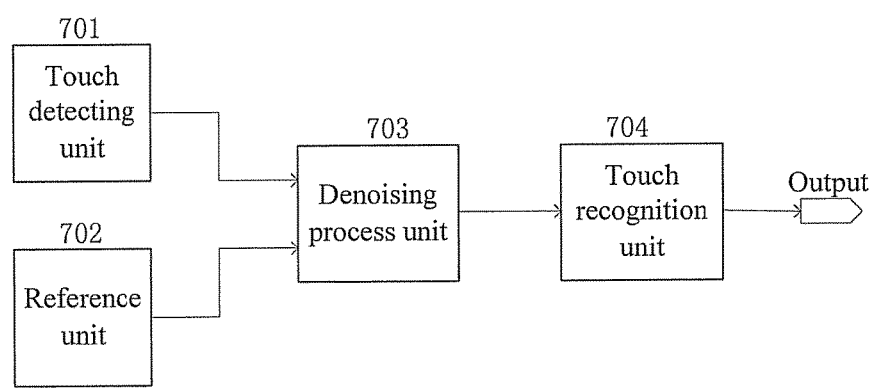
FIG. 7 is a basic frame view of a second touch detection circuit noise processing of the present embodiment.

FIG. 7 is a basic frame view of a second touch detection circuit noise processing of the present embodiment.

The procedure for touch detection and processing is shown in FIG. 7, which includes four parts of a touch detection unit 701, a reference unit 702, a denoising process unit 703 and a touch recognition unit 704. Firstly, the touch detection unit 701 detects a change of the touch detection signal, meanwhile the reference unit 702 obtains a reference voltage signal, the touch detection signal and the reference voltage signal go through the denoising process unit 703 to remove the background noise generated by data refresh and obtain a touch result signal having the interference of data driving removed, and finally, the touch recognition unit 704 determines whether exists a touch based on the touch result signal and output the determined result to the system. That is to say, the touch detection unit 701 detects whether the touch detection signal changes and then the touch recognition unit 704 recognizes whether a touch occurred.

Figure 8:
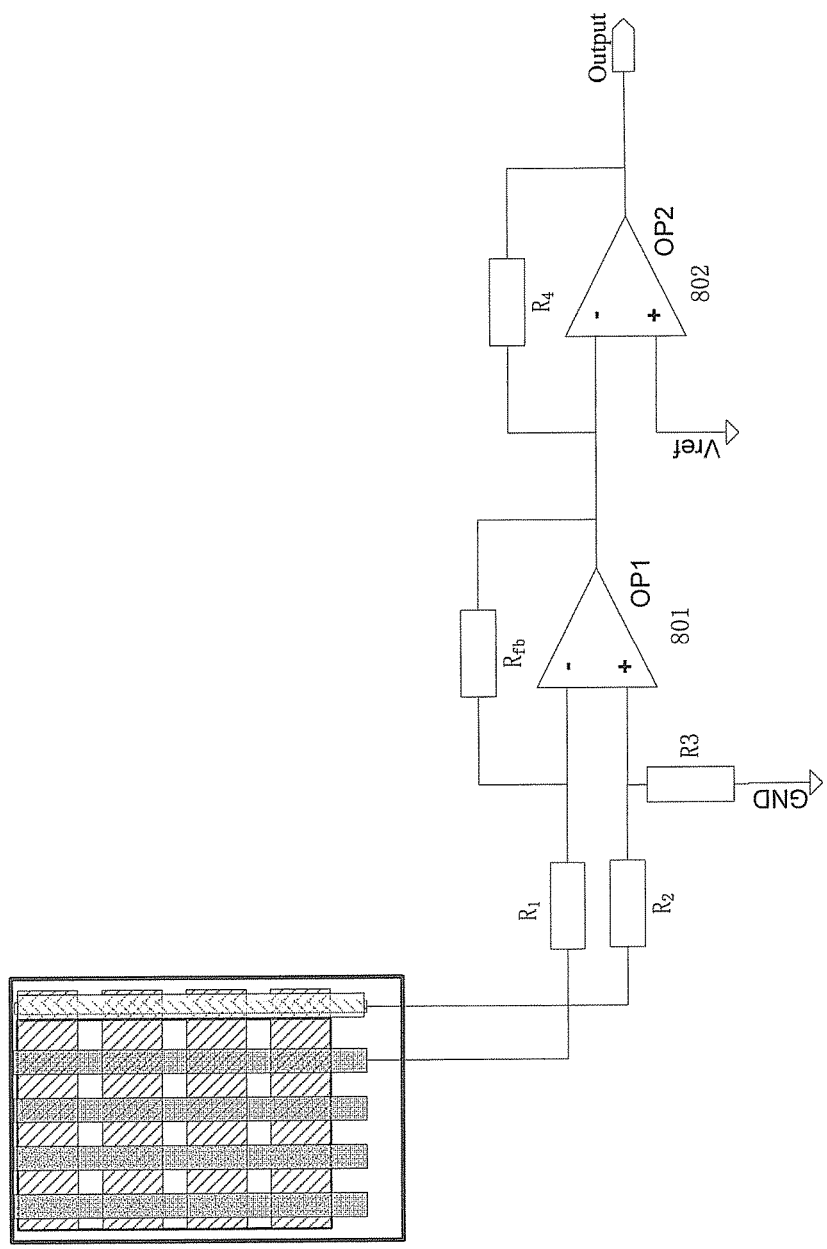
FIG. 8 is a detailed circuit view of a second touch detection circuit noise processing device of the present embodiment.

FIG. 8 is a detailed circuit view of a second touch detection circuit noise processing of the present embodiment.

As shown in FIG. 8, the touch detection circuit is configured to implement the touch detection unit of FIG. 7; the reference receiving circuit is configured to implement the reference unit of FIG. 7; the subtract unit 801 is configured to implement the denoising process unit of FIG. 7, by the denoising process unit, a touch result signal having the interference of data driving removed is obtained; and a comparison circuit 802 configured to implement the touch recognition unit of FIG. 7 to determine whether a touch occurs.

The touch detection circuit comprises a plurality of touch driving electrode and a plurality of sensing electrode, configured to generate touch detection signals. The reference receiving circuit comprises a reference electrode overlapping with all of the touch driving electrodes and in parallel with the touch sensing electrodes, and is configured to providing a reference voltage signal. A subtract circuit 701 is configured to receive a touch detection signal from the touch detection unit and a reference voltage signal from the reference receiving circuit, and subtract the touch detection signal and the reference voltage signal to generate the touch result signal having the interference of data driving removed. The comparison circuit 802 compares the touch result signals from the denoising process unit and a preset reference signal Vref, when the touch result signal is determined greater by the comparison circuit 802, a touch is recognized to occur. The preset reference signal can be set according to the actual circuit. For example, the preset reference signal can be set as ground signal.

Although FIG. 8 only shows a circuit for connecting and processing one touch sensing electrode Rx, it is understood to those skilled in the art that other touch sensing electrodes Rx can be subject to similar connecting and processing. That is to say, for a plurality of touch sensing electrode Rx_1~Rx_n, the denoising process unit comprises n subtract circuits and the touch recognition unit comprises n comparison circuits.

FIG. 9 is a schematic view of a second touch detection circuit configuration of the present embodiment.

As shown in FIG. 9, the second touch detection circuit comprises a touch detection unit, a reference unit and a denoising process unit. The touch detection unit comprises m touch driving electrodes Tx and n touch sensing electrodes Rx intersecting each other, and configured to conduct touch detection and generate touch detection signals. The touch detection unit as shown in FIG. 9 is the same to that in FIG. 4 and thus will not be described any more.

The reference unit comprises a plurality of reference electrodes C_1~C_n, configured to providing reference voltage for each of the touch sensing electrode Rx. As shown in FIG. 9, the plurality of reference electrodes are located in the display region, one reference electrode is added besides each of the touch sensing electrode Rx, the reference electrode overlaps the touch driving electrode Tx and a shield layer S_1~S_n is provided to shield the interference to the reference voltage signal from the outside touch. The shield layer S is disposed on the reference electrode C such that the reference electrode becomes a reliable noise reference source and will not be influenced by the touch. For example, the layer of metal may be a separate layer on the colored film.

Although it is shown in FIG. 9 that only one reference electrode C1~Cn is added besides each of the touch sensing electrode Rx, it is understood to those skilled in the art that one reference electrode may be added besides one, two or three etc. touch sensing electrodes Rx.

The denoising process unit is configured to receive the touch detection signal from the touch sensing electrode Rx and the reference voltage signal from the reference electrode, and process the touch detection signal and the reference voltage signal to generate a touch result signal having the interference of data driving removed.

Figure 10:
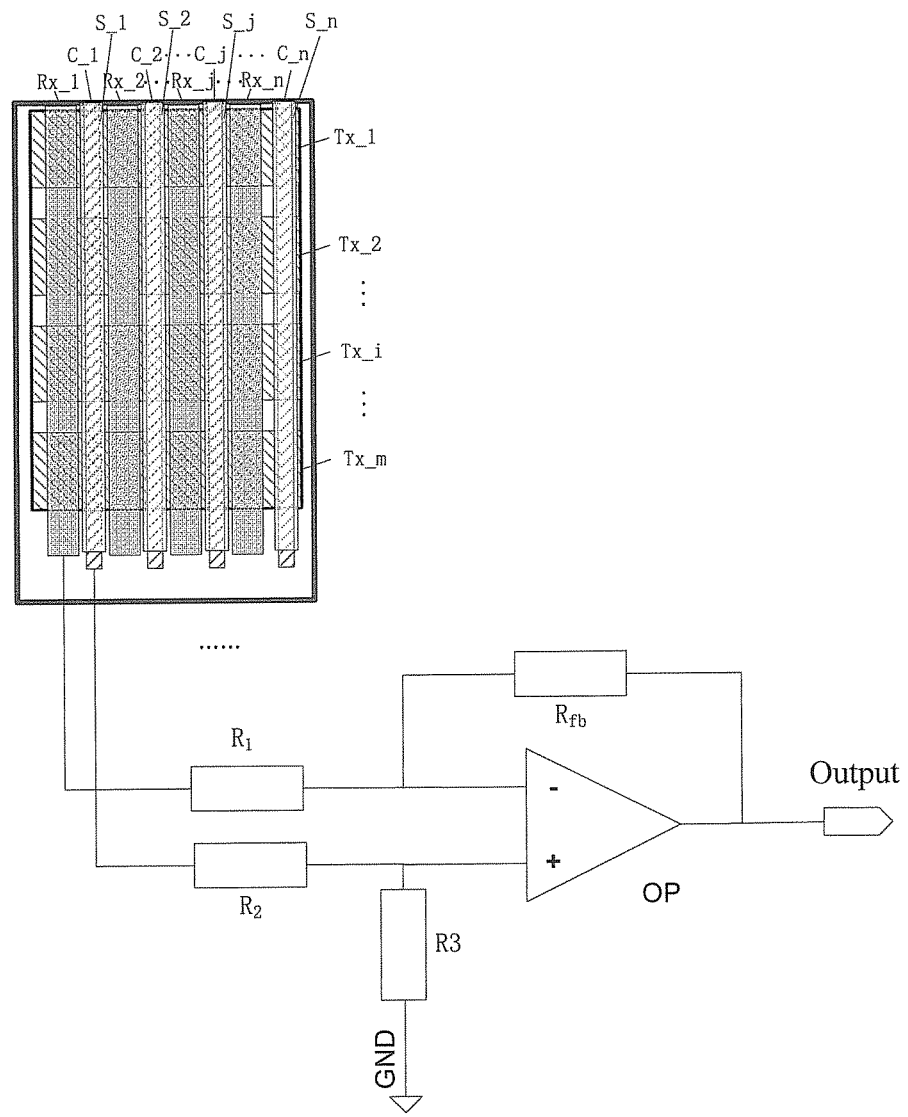
FIG. 10 is a detailed circuit view of a third touch detection circuit noise processing device of the present embodiment.

FIG. 10 is a detailed circuit view of a third touch detection circuit noise processing device of the present embodiment.

The touch detection and processing is shown in FIG. 10, the denoising reference voltage is changed from one by sharing to each group (or every two groups) shares one reference voltage, such that the influence of the signal delay maybe more effectively reduced, thus better realizing the denoising function.

For conciseness, FIG. 10 only shows a denoising process unit connecting one touch sensing electrode and reference electrode pair, however it is understood to those skilled in the art that for other touch sensing electrode and reference electrode pair, same manner may be adopted for denoising process. That is to say, each touch sensing electrode and reference electrode pair comprises a subtract circuit.

Figure 11:
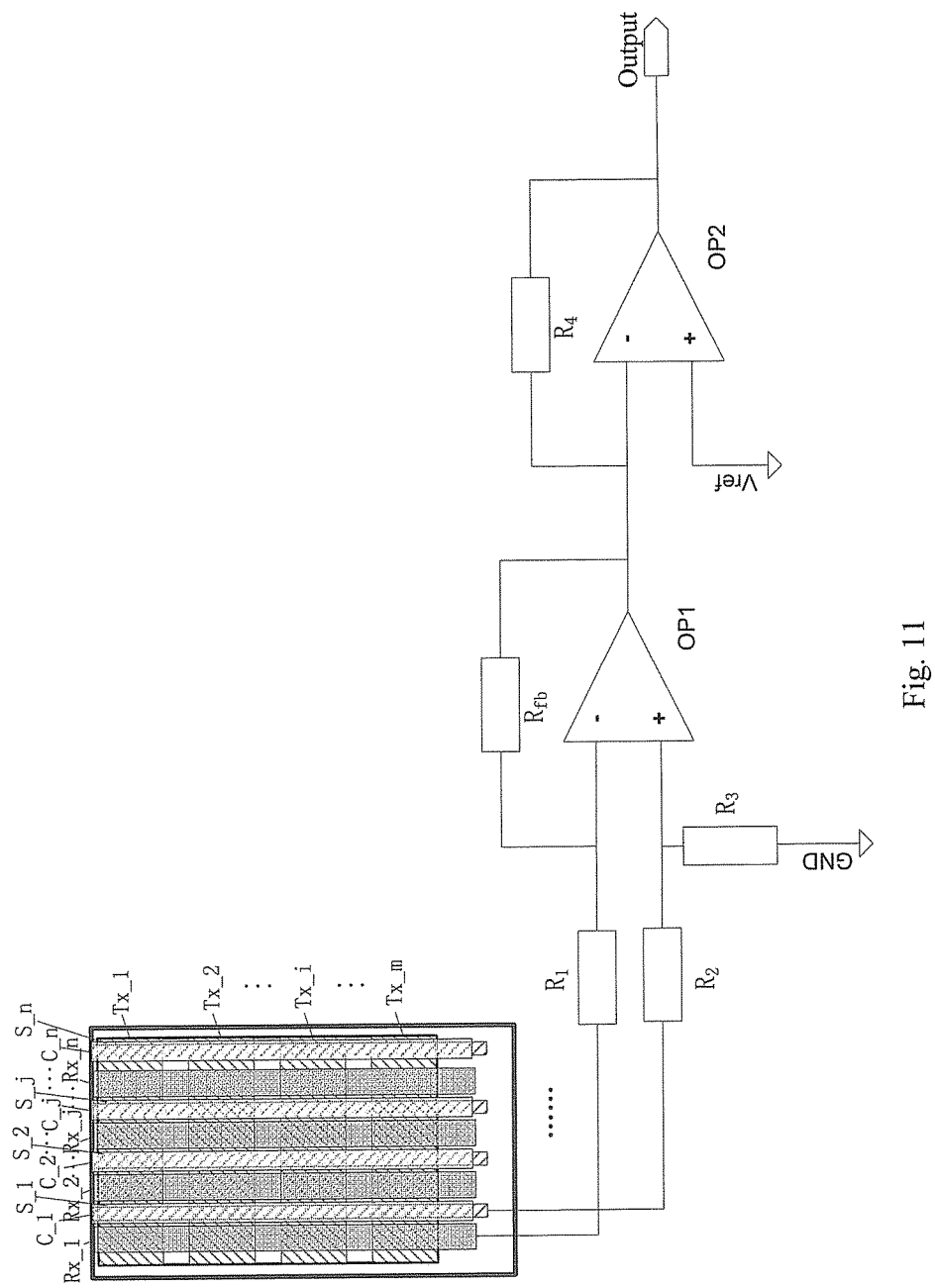
FIG. 11 is a detailed circuit view of a fourth touch detection circuit noise processing device of the present embodiment.

FIG. 11 is a detailed circuit view of a fourth touch detection circuit noise processing device of the present embodiment.

The touch detection and processing is shown in FIG. 11, the denoising reference voltage is changed from one by sharing to each group (or every two or more groups) one reference voltage, such that the influence of the signal delay maybe more effectively reduced, thus better realizing the denoising function.

For conciseness, FIG. 11 only shows a denoising process unit and a touch recognition unit connecting one touch sensing electrode and reference electrode pair, however it is understood to those skilled in the art that for other touch sensing electrode and reference electrode pair, same manner may be adopted for denoising process. That is to say, each touch sensing electrode and reference electrode pair comprises a subtract circuit and a comparison circuit.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

It is understood that those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

The above is illustrative of the invention and should not be considered limiting thereof. Although a number of exemplary embodiments of the present invention, those skilled in the art will readily appreciate without departing from the novel teaching and advantages of the present invention may be provided in the exemplary embodiments many modifications. Accordingly, all such modifications are intended to be included within the claims as defined by the scope of the invention. It should be understood that the above description of the present invention, and should not be considered limited to the particular embodiments disclosed, and modifications are intended to the disclosed embodiment as well as other embodiments included within the scope of the appended claims. The present invention is defined by the appended claims and equivalents thereof.

The present application claims priority to Chinese Patent Application No. 201510290237.2 filed on May 29, 2015, the contents of which are hereby incorporated by reference in its entirety as part of the disclosure of the present application.

What is claimed is:

1. A display device integrated with touch function, comprising:
    a display unit, comprising a display region;
    a touch detection circuit configured to conduct touch detection, and generate a plurality of touch detection signals;
    a driving unit configured to simultaneously drive a data refresh of the display unit and the touch detection of the touch detection circuit, wherein a region for the data refresh and a region for the touch detection do not overlap at the same time period; and
    a plurality of shield layers;
    wherein the touch detection circuit comprises:
    a touch detection unit comprising a plurality of touch driving electrodes and a plurality of touch sensing electrodes intersecting the plurality of touch driving electrodes, and configured to generate the plurality of touch detection signals, the plurality of touch driving electrodes and the plurality of touch sensing electrodes being located in the display region; and
    a reference unit comprising a plurality of reference electrodes which overlap at least part of the plurality of touch driving electrodes of the touch detection unit, are configured to provide a reference voltage signal, and are located in the display region, wherein each reference electrode corresponds to at least one touch sensing electrode, the plurality of shield layers are configured to shield interference to the reference voltage signal from outside touch, such that the plurality of reference electrodes are not influenced by the outside touch, the plurality of shield layers are in one-to-one correspondence to the plurality of reference electrodes, and are insulated from the plurality of reference electrodes, relative to the plurality of reference electrodes, the plurality of shield layers are closer to a touch side of the display device,
    in a direction perpendicular to the display region, each of the plurality of shield layers is disposed on a corresponding reference electrode of the plurality of reference electrodes, and overlaps at least part of the corresponding reference electrode.

2. The display device according to claim 1, further comprising:
    a detection control unit configured to control the touch detection of the touch detection circuit; and
    a timing control unit configured to control the data refresh of the display unit, wherein the detection control unit and the timing control unit are driven by the driving unit such that the touch detection of the touch detection circuit and the data refresh of the display unit are conducted simultaneously.

3. The display device according to claim 1, wherein the touch detection circuit further comprises:
a denoising process unit configured to receive the touch detection signals from the touch sensing electrodes and the reference voltage signal from the plurality of reference electrodes, and process the plurality of touch detection signals and the reference voltage signal to generate a plurality of touch result signals having interference of data driving removed.

4. The display device according to claim 3, wherein the denoising process unit comprises a plurality of subtract circuits, each is configured to receive one of the plurality of touch detection signals from the touch detection unit and a reference voltage signal, and subtract the touch detection signal and the reference voltage signal to generate the touch result signal.

5. The display device according to claim 4, wherein the touch. detection circuit further comprises: a touch recognition unit configured to determine Whether a touch occurs based on the touch result signal.

6. The display device according to claim 5, wherein the touch recognition unit comprises a plurality of comparison circuits, each is configured to compare one of the plurality of touch result signals and a preset reference signal, when the touch result signal is determined greater than the preset reference signal, a touch is recognized to occur.

7. The display device according to claim 3, wherein the plurality of reference electrodes are in one-to-one correspondence to the plurality of touch sensing electrodes.

8. The display device according to claim 1, wherein the frequency of the data refresh scanning is the same to the frequency of the touch detection scanning.

9. The display device according to claim 1, wherein the frequency of the data refresh scanning is double of the frequency of the touch detection scanning.

10. A driving method for a display device integrated with touch function and the display device comprising a display unit and a touch detection circuit and a plurality of shield layers, the display unit comprising a display region, the touch detection circuit comprising a touch detection unit and a reference unit,
the touch detection unit comprising a plurality of touch driving electrodes and a plurality of touch sensing electrodes intersecting the plurality of touch driving electrodes, the plurality of touch driving electrodes and the plurality of touch sensing electrodes being located in the display region, and
the reference unit comprising a plurality of reference electrodes which overlaps at least part of the plurality of touch driving electrodes of the touch detection unit, and are located in the display region, wherein each reference electrode corresponds to at least one touch sensing electrode, the plurality shield layers is in one-to-one correspondence to the plurality of reference electrodes, and are insulated from the plurality of reference electrodes, relative to the plurality of reference electrodes, the plurality of shield layers are closer to a touch side of the display device, in a direction perpendicular to the display region, each of the plurality of shield layers is disposed on a corresponding reference electrode of the plurality of reference electrodes, and overlaps at least part of the corresponding reference electrode,
the method comprising: simultaneously driving a data refresh of the display unit and touch detection of the touch detection circuit, wherein a region for the data refresh and a region for the touch detection do not overlap at the same time period,
wherein the touch detection comprises:
providing a reference voltage signal by the plurality of reference electrodes, wherein the plurality of shield layers are configured to shield interference to the reference voltage signal from outside touch, such that the plurality of reference electrodes are not influenced by the outside touch;
generating a plurality of touch result signals having interference of data driving removed according to the reference voltage signal.

11. The driving method according to claim 10, wherein the generating a plurality of touch result signals having the interference of data driving removed according to the reference voltage signal comprises:
providing a plurality of touch detection signals by the touch detection unit;
processing the plurality of touch detection signals by a denoising process unit according to the reference voltage signal to generate the plurality of touch result signals having the interference of data driving removed.

12. The driving method according to claim 11, further comprises;
determining whether a touch occurs by a touch recognition unit according to the touch result signal.

* * * * *